US009961129B2

United States Patent
Acharya et al.

(10) Patent No.: US 9,961,129 B2
(45) Date of Patent: May 1, 2018

(54) BUSINESS TRANSACTION CORRELATION WITH CLIENT REQUEST MONITORING DATA

(71) Applicant: AppDynamics LLC, San Francisco, CA (US)

(72) Inventors: Manoj Acharya, San Ramon, CA (US); Binil Thomas, Walnut Creek, CA (US); Vinay Srinivasaiah, San Carlos, CA (US); Adam Cath, San Francisco, CA (US); Ed Rowe, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 14/018,346

(22) Filed: Sep. 4, 2013

(65) Prior Publication Data

US 2015/0067031 A1 Mar. 5, 2015

(51) Int. Cl.
*H04L 1/00* (2006.01)
*H04L 29/08* (2006.01)
*H04W 4/00* (2018.01)

(52) U.S. Cl.
CPC .............. *H04L 67/10* (2013.01); *H04W 4/003* (2013.01)

(58) Field of Classification Search
CPC ......... H04L 67/02; H04L 41/50; H04L 43/16; G06F 11/1464; G06F 17/30876
USPC ........................................................ 709/203
See application file for complete search history.

(56) References Cited

U.S. PATENT DOCUMENTS

| 7,350,229 | B1* | 3/2008 | Lander | H04L 63/0815 709/225 |
| 7,519,702 | B1* | 4/2009 | Allan | G06F 15/173 709/201 |
| 7,873,715 | B1* | 1/2011 | Haber | G06F 17/30899 707/634 |
| 8,266,281 | B1* | 9/2012 | Carlson | G06F 11/3419 709/203 |
| 2007/0083649 | A1* | 4/2007 | Zuzga | G06F 11/3419 709/224 |
| 2008/0114875 | A1* | 5/2008 | Anastas | G06F 17/30896 709/224 |

(Continued)

OTHER PUBLICATIONS

"Diagnosing Slow Web Servers with Time to First Byte" available at: http:www.websiteoptimization.com/speed/tweak/time-to-first-byte/ [accessed Feb. 18, 2015].

(Continued)

*Primary Examiner* — Arvin Eskandarnia
(74) *Attorney, Agent, or Firm* — Parker Ibrahim & Berg LLP; James M. Behmke; Stephen D. LaBarron

(57) ABSTRACT

A system monitors a client request and a backend business transaction performed in response to the request and correlates the data generated from monitoring the request and business transaction. A request may be monitored in detail to determine several metrics. The metrics may include server connection time, response receipt completion time, document download time, document processing time, and page rendering time. The metrics may be determined for an entire content page as well as individual page elements, such as Iframes and elements constructed from AJAX techniques.

37 Claims, 11 Drawing Sheets

(56) References Cited

U.S. PATENT DOCUMENTS

| | | | |
|---|---|---|---|
| 2011/0016205 A1* | 1/2011 | DeBettencourt | H04L 67/22 709/224 |
| 2011/0082850 A1* | 4/2011 | Ball | G06F 17/30867 707/706 |
| 2011/0167156 A1* | 7/2011 | Mani | H04L 67/125 709/224 |
| 2013/0145367 A1 | 6/2013 | Moss et al. | |
| 2013/0185643 A1* | 7/2013 | Greifeneder | H04L 67/02 715/736 |
| 2014/0101236 A1* | 4/2014 | Dietrich | H04L 67/146 709/203 |

OTHER PUBLICATIONS

Loosley, Chris; "Rich Internet Applications: Design, Measurement, and management Challenges" available at: http://www.keynote.com/key-programs/emea/ebook/RichInternet_5.pdf [accessed Feb. 18, 2015].

"Managing RIA's [6]: Measurement Challenges" available at: http://www.webperformancematters.com/journal/2006/3/25/managing-rias-6-measurement-challenges.html [accessed Feb. 18, 2015].

"Web applications Performance Testing Metrics" by Agile Support Team, Feb. 18, 2013. Available at: http://www.agileload.com/agileload/blog/2013/02/18/web-applications-performance-testing-metrics [accessed on Feb. 18, 2015].

United Kingdom Application No. GB1407519.6 Search Report dated Feb. 20, 2015.

U.S. Appl. No. 14/245,938, Manoj Acharya, System and Method for Determining End User Timing, filed Apr. 4, 2014.

\* cited by examiner

US 9,961,129 B2

BUSINESS TRANSACTION CORRELATION WITH CLIENT REQUEST MONITORING DATA

BACKGROUND

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. A web application may be initiated by a request received from a client. To provide a complete picture of the performance of a web application, it is helpful to monitor both the backend processing of a request by the web application as well as the network and other processing of the request.

Typically, monitoring systems determine the time it takes to process a request on a back-end system and the total time to handle a request from the point of view of a client which initiates the request. The difference of the two times is typically attributed to network latency. Attributing time difference to the network does not provide a complete explanation of how the processing of a request is distributed in time.

There is a need in the art for web service monitoring which may accurately and efficiently monitor the performance of distributed applications from the point of view of a backend server and a client device sending a request to the server, as well as a need for correlating data derived from monitoring each end of a transaction.

SUMMARY

The present technology monitors a client request received through a rendered content page and a backend business transaction performed in response to the request and correlates the data generated from monitoring the request and business transaction. A request may be monitored in detail to determine several metrics. The metrics may include server connection time, response receipt completion time, document download time, document processing time, and page rendering time. The metrics may be determined for an entire content page as well as individual page elements, such as Iframes, frames, and elements constructed using AJAX techniques.

When a request is received through a content page rendered by a network browser, a corresponding request may be sent to a backend server, which results in performance of a business transaction. The monitoring data for the business transaction and metrics obtained from monitoring the processing of the request at the client may be correlated using a unique identifier. The unique identifier may created by an agent on the backend server or by an agent in the browser application. A controller may access business transaction monitoring data and request to correlate the data and report it to a user.

In an embodiment, a method for reporting data may receive, from a client, a client request identifier and data associated with processing the client request at the client device. The client request identifier and data associated with processing a business transaction associated with the client request may be received from one or more servers. Data associated with processing the client request at the client device and the data associated with processing a business transaction at the one or more servers may be reported.

In an embodiment, a method for reporting data may send a request to a remote server. A unique request identifier associated with the request may be received from the server, wherein the unique request identifier created by the server in response to receiving the request. Performance data associated with processing the request by the network browser may be captured. The performance data and the unique request identifier associated with the request may be reported.

In an embodiment, a method for reporting data may receive a request from a client, the request associated with one of a plurality of content page elements requesting data from one or more remote servers. A unique request identifier for the received request may be generated, and the unique request identifier may be transmitted to the requesting client.

In an embodiment, a method for reporting data may receive input associated with a content page through a network browser on a client device. A first time at which the client device connects with a server that creates a response having content for a content page may be detected, wherein the response created in response to a request sent based on the received input. A second time at which the response completed at the client device may be detected.

In embodiments, the methods described above may be performed by systems. Additionally, one or more modules stored on memory may be executable by one or more processors to perform the above methods.

DETAILED DESCRIPTION

Embodiments of the present invention monitor a client request and a backend business transaction performed in response to the request. Data generated from monitoring the request and the business transaction may be correlated and reported together. A request may be monitored in detail to determine metrics such as for example server connection time, response receipt completion time, document download time, document processing time, and page rendering time. The metrics may be determined for an entire content page as well as individual page elements, such as Iframes and elements constructed from AJAX techniques.

A request for content may be sent to a backend server. The request may be generated by a user, for example when a request is received through a content page (e.g., selecting a link) rendered by a network browser or the browser itself (e.g., selecting a bookmark), or may be automatically generated (e.g., an automated update to the page). The request may be generated by a network browser or other client software or hardware that loads content provided by a remote server. The request to the backend server may result in performance of a business transaction. The monitoring data for the business transaction and metrics obtained from monitoring the processing of the request at the client may be correlated using a unique identifier. The unique identifier may be created by an agent on the backend server or by an agent in the browser application. A controller may access business transaction monitoring data and request to correlate the data and report it to a user.

An agent may be provided to monitor a request. The agent may be embedded in the HTML being downloaded to the client, inserted into a content page, or otherwise provided on the client to monitor the request. In some embodiments, a server agent may embed an agent in the HTML code provided to a client. The browser application agent may retrieve data and timing information upon completion of certain tasks or events occurring at the browser application. Agents installed on one more servers may monitor performance of an application. Agents at both the browser application and the server(s) may report data to a controller. The controller may receive the data, correlate data from the browser application and servers together, and report correlated data.

Figure 1:
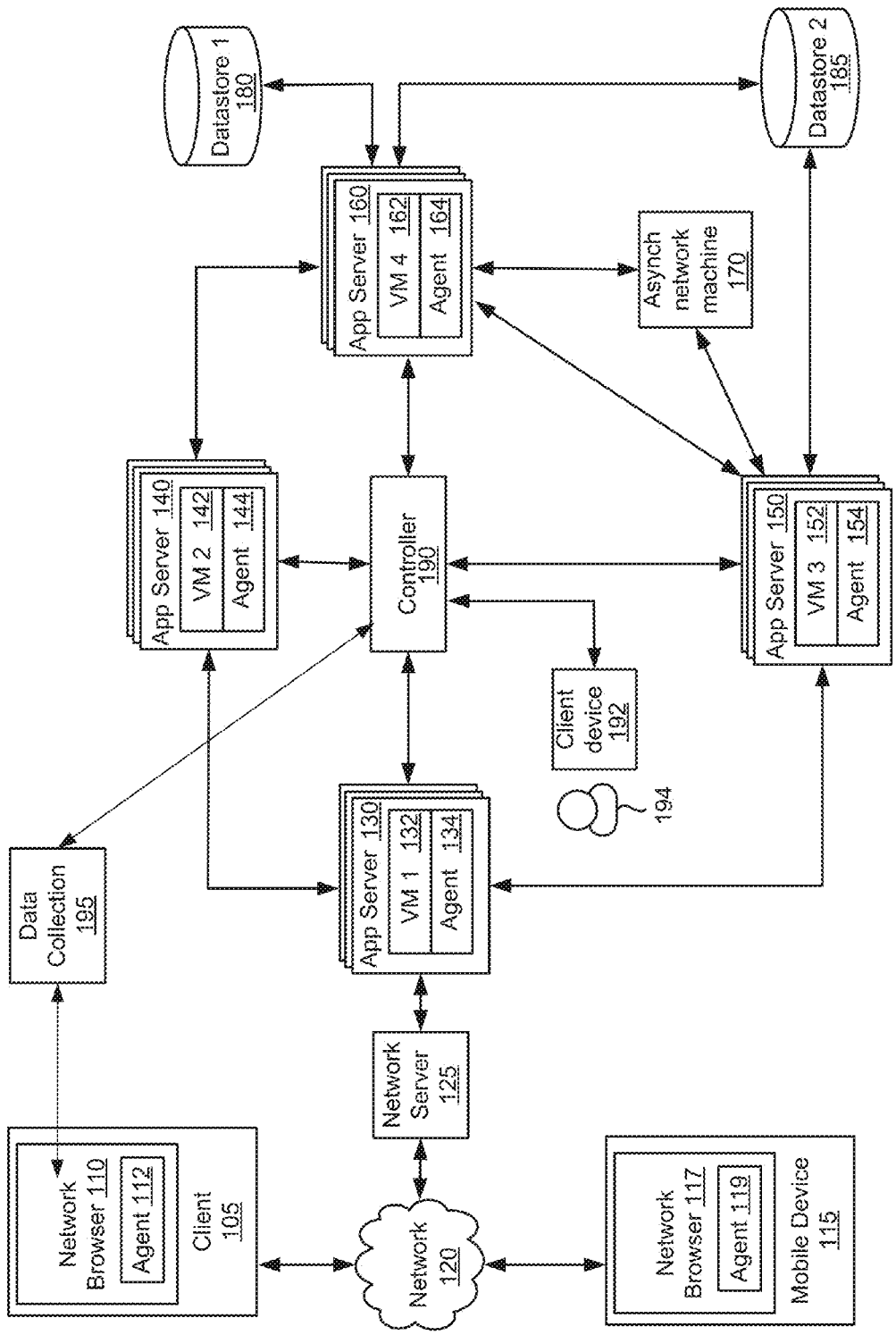
FIG. 1 is a block diagram of an exemplary system for monitoring correlated requests and business transactions.

FIG. 1 is a block diagram of an exemplary system for monitoring correlated requests and business transactions. System 100 of FIG. 1 includes client device 105, mobile device 115, network 120, network server 125, application servers 130, 140, and 150, data collection server 195, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be embedded, installed or otherwise provided on network browser 110 and/or client 105, for example as a network browser add-on, downloading the agent to the network browser as part of HTML, or in some other manner. Agent 112 may be executed to monitor network browser 110, the operation system of client 105, and any other application, API, or other component of client 105. Agent 112 may determine network browser navigation timing metrics, access browser cookies, and transmit data to data collection 195, controller 190, or another device. Agent 112 may perform other operations related to monitoring a request at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 195 and/or controller 190.

Network 120 may facilitate communication of data between different servers, devices and machines. The network may be implemented as a private network, public network, intranet, the Internet, a cellular network, Wi-Fi network, VoIP network, or a combination of one or more of these networks.

Network server 125 is connected to network 120 and may receive and process requests received over network 120. Network server 125 may be implemented as one or more servers implementing a network service. When network 120 is the Internet, network server 125 may be implemented as a web server. In some embodiments, network server 125 and application server 130 may be a single server, or include multiple machines that each implement a network server and an application server.

Application server 130 may communicate with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

In embodiments, applications may execute on servers in program containers other than a virtual machine. For example, applications may be executed in PHP on any of servers 130-160.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132.

Agent 134 on application server 130 may be installed on application server 130 by instrumentation of object code, downloading the agent to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Agent 134 may create a request identifier for a request received by server 130. The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application no. U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140 and 150 may include an application and an agent. Each application may run on the corresponding application server or a virtual machine. Each of virtual machines 142 and 152 on application servers 140-150 may operate similarly to virtual machine 132. Agents 144 and 154 may operate similarly to agent 134.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by a machine, such as for example an application servers such as application server 150 or client 110 Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive runtime data, including data associated with monitoring client requests at client 105 and mobile device 115, from data collection server 195. In some embodiments, controller 190 may receive runtime data from each of agents 112, 119, 134, 144 and 154. Controller 190 may associate portions of business transaction data with other portions of business transaction data and virtual machines, applications, and other nodes and hardware that the business transaction data is generated from monitoring, communicate with agents to configure collection of runtime data, and provide performance data and reporting through an interface. Performance data may include metrics, errors, and other data and events which may be captured and/or generated during the monitoring of a distributed transaction. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Controller 190 may also correlate request metrics with business transaction data received from client 105 and mobile device 115 and from application servers 130-150, respectively.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2A:
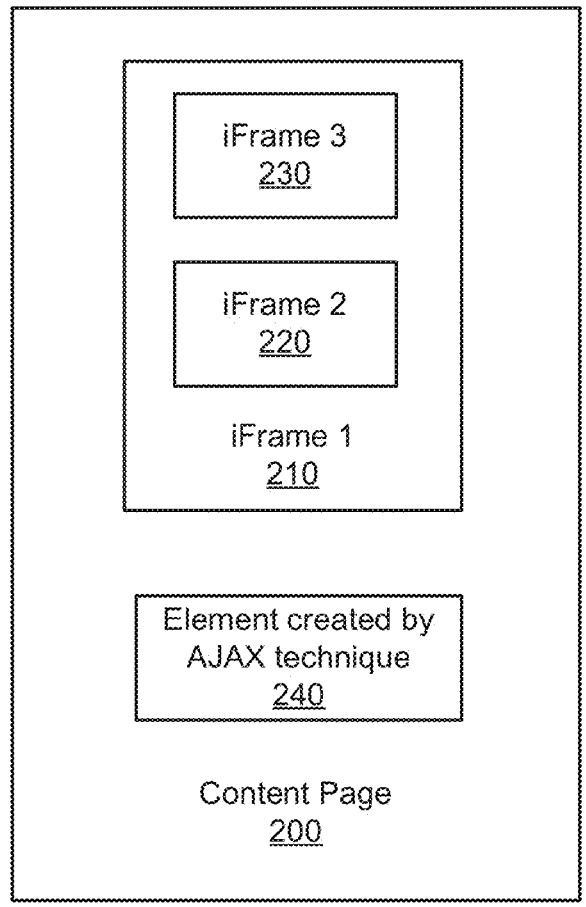
FIG. 2A is a block diagram of a content page with multiple elements.
Figure 2B:
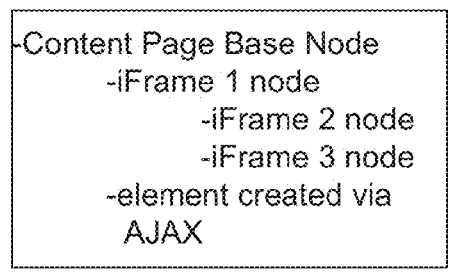
FIG. 2B is an outline of a node hierarchy for the content page of FIG. 2A.

FIG. 2A is a block diagram of a content page with multiple elements. The elements of content page 200 include Iframe 210, Iframe 220, Iframe 230 and element 240 created by AJAX techniques. Each of elements 210-240 may initiate sending a request to a web application over network 120, and each element may be associated with a node. In the context of a content page described by an HTML document, a node may be a portion of HTML code within a content page file. A content page may be described by a data structure representing a tree of nodes. FIG. 2B is an outline of a node hierarchy for the content page of FIG. 2A. As shown, the content page as whole may have a base node. Each element may be associated with a node according to the hierarchy of the page. For example, the base page node may have children nodes of Iframe 1 (210) and AJAX element 240. The Iframe 1 node has child nodes of Iframe 2 (220) and Iframe 3 (230). As discussed in more detail below (see FIGS. 3 and 5), a request ID is sent by an agent on a server to an agent on a client device for a particular request sent by the client-side agent. The client side agent may then transmit the request ID for the content page, iframe or ajax generated request that transmitted the request associated with the request ID is along with the parent page request ID and the content page base node ID when reporting client-side data.

Figure 3:
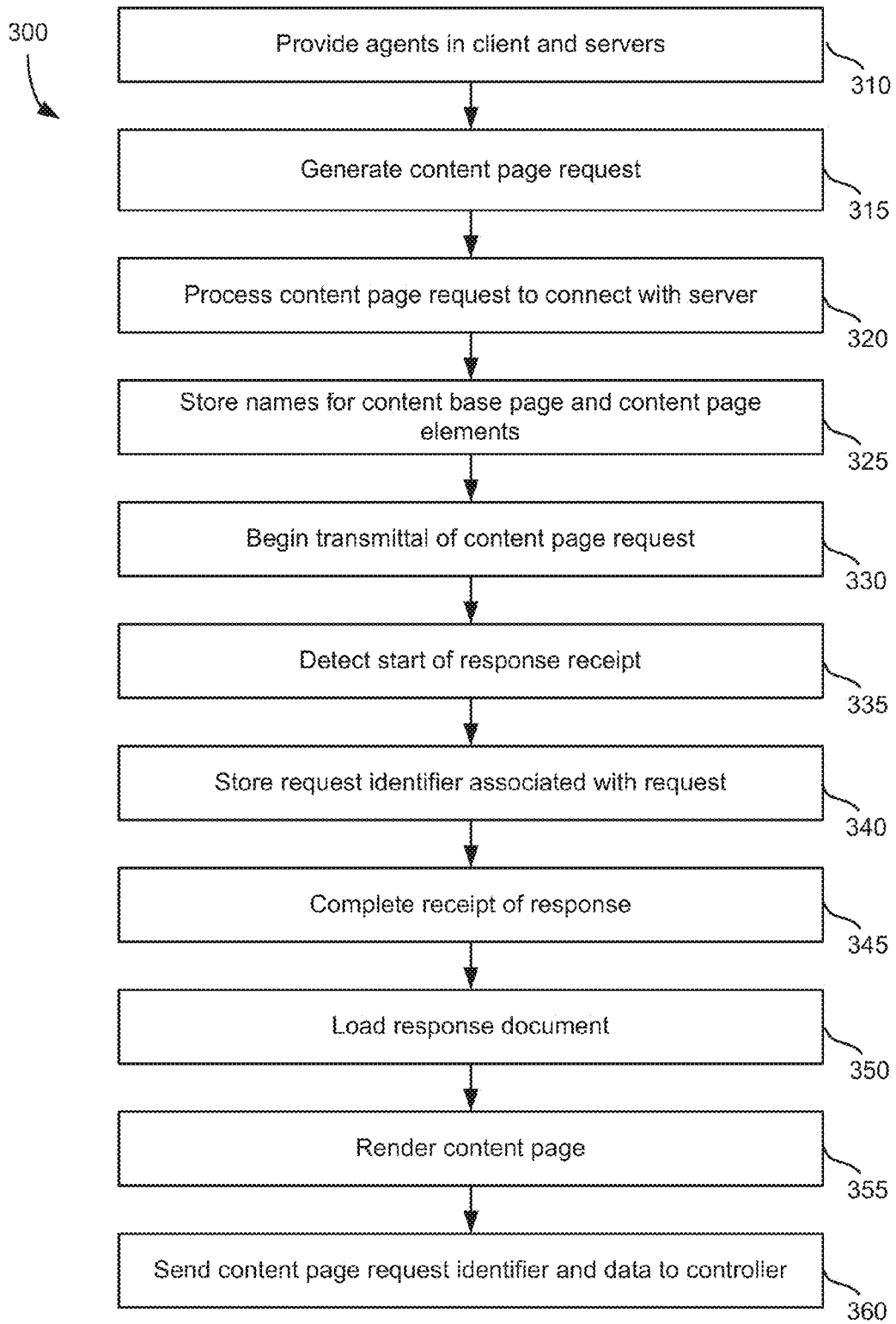
FIG. 3 is an exemplary method for monitoring client requests.

FIG. 3 is an exemplary method for monitoring client requests. Agents may be provided at the client, for example at a browser, and at one or more servers at step 310. The agents may be provided to a client by embedding an agent in HTML downloaded to a client and loaded into a network browser, downloading, or other method. An agent may be provided at a server by byte code instrumentation, downloading the agent to the server, or some other method. An agent may be installed on each of browser application 110, browser application 117, application servers 130, 140 and 150, virtual machines (or, in some cases, PHP programs) 132, 142 and 152, or elsewhere on computing device 110, mobile device 115, and application servers 140-150. At some point, controller 190 may also be configured. Configuring controller 190 may include loading software onto controller 190 for communicating with one or more agents, processing runtime data, reporting performance information, and performing other operations. Operation of controller 190 is discussed in more detail with respect to FIG. 6.

A content page request may be generated at step 315. The content page request may be received through a content page rendered by a browser application, through a selection of the browser application itself, or generated based on an event not initiated by a user. For example, the request may be generated from received input selecting a link, button, or media for display, submission of text within a text box, selection of a bookmark, an automated update, or some other event. The generated content page request may be associated with a particular content page element, such as an Iframe, frame, or an element generated using AJAX techniques, or the content page in general.

Steps 320-350 may be initiated or performed on a browser application and may be monitored by an agent within the application or the device hosting the application. Steps 320-350 may be performed for each content page element of a content page rendered by network browser 110, such as for example each Iframe, frame, element generated using AJAX techniques, and so on. Though steps 320-350 are discussed below with respect to agent 112 on network browser 110, the steps may be performed by agent 119 on mobile device browser 117 and other client devices.

The content page input may be processed to connect with a server that may process the request at step 320. Processing the request may include collecting data to determine a server connection time—e.g., the time it takes client 110 to establish a connection with server 130 which can process the request. Put another way, the server connection time may include the time it takes the browser to resolve and start fetching the document from a server or application cache, including connection re-directs, domain server look-up operations, TCP communications and SSL communications. The time to determine server connection time is the time at which the connection with the server is complete, but before any response data is transmitted to the server from the client. In embodiments, the present technology may utilize W3C navigation timing metrics to determine redirects, DNS, and TCP. An agent within the network browser that originated the request may store the start time and end time associated with connecting to the server.

Names for the base content page and content page elements are stored at step 325. The names are used to identify content page element hierarchy. The page name may be created based on any of several factors, including a URI of the page, Iframe or AJAX request, the domain name of the request (e.g., www.costco.com), the protocol used for the request (http), a user defined page name, or other source of information. Names may be provided upon page rendering, upon receiving a request from a particular content page element, or at some other time. In some embodiments, a base content page and/or other content page element names may be determined by a collector that receives data from an agent monitoring performance at a client.

Transmittal of the client request may begin at step 330. Agent 112 may detect the initial transmission of the client request, which may occur as soon as the server connection is completed. In embodiments, the end of the client request transmission may or may not be tracked. The time at which the content page is first transmitted may be stored by agent 112 or by a network browser which makes it available to the agent.

The start of a response received by the server by client 105 is detected at step 335. The response is transmitted by server 130 in response to the request sent at step 330. Receipt of the response may extend over a period of time, and may overlap with a portion of the request sent to the server providing the response. The time at which the response is first received may be stored by agent 112 or by a network browser which makes it available to the agent.

A request identifier associated with the request at step 330 may be stored at step 340. The request identifier may be generated by a server processing the request and sent to the client 105. For example, agent 134 on application server 130 may detect receipt of the request, generate a request identifier, and transmit the request identifier to client 105. In some instances, a client which sends the original request may generate a request identifier. Storing the request at step 340 is discussed in more detail with respect to the method of FIG. 4.

The receipt of the response is completed at client 105 at step 345. After receiving the response, which may be received incrementally, the document contained in the response is loaded at step 350. While loading the document (which may be done incrementally), the start time of the document load and the end time of the document may be stored by agent 112 or may be made available to the agent by a network browser. As it is loading, the document may be available for Java scripts to apply rendering logic.

The content page may be rendered, for example incrementally as it is received, at step 355. Rendering the content page may include downloading and displaying remaining resources such as image and other rendering tasks. Agent 112 may store the start time and end time of rendering the content page or these may be available to the agent by a network browser.

Data may be sent by agent 112 to data collection 195 and ultimately to controller 190 at step 360. A data collection application may be implemented remotely on server 160 (discussed herein for purposes of example) or, in some embodiments, at the client device. The data collection application may aggregate received data and transmit data to controller 190. The data sent to data collection 195 by agent 112 may include runtime data associated with server connect time, response available time, document download and processing time, and page rendering time. The data sent to data collection 195 may also include request identification information for the data associated with the request, a page name to identify the source of the request, the name of the parent page to the requesting page, and the base page name for the requesting page. The data may be transmitted periodically, in response to a request for data from the controller, in response to the completion of a client request, or based on some other event. The data may be aggregated and transmitted to controller 190, where it is received and processed. Operation of controller 190 is discussed below with respect to FIG. 6.

Figure 4:
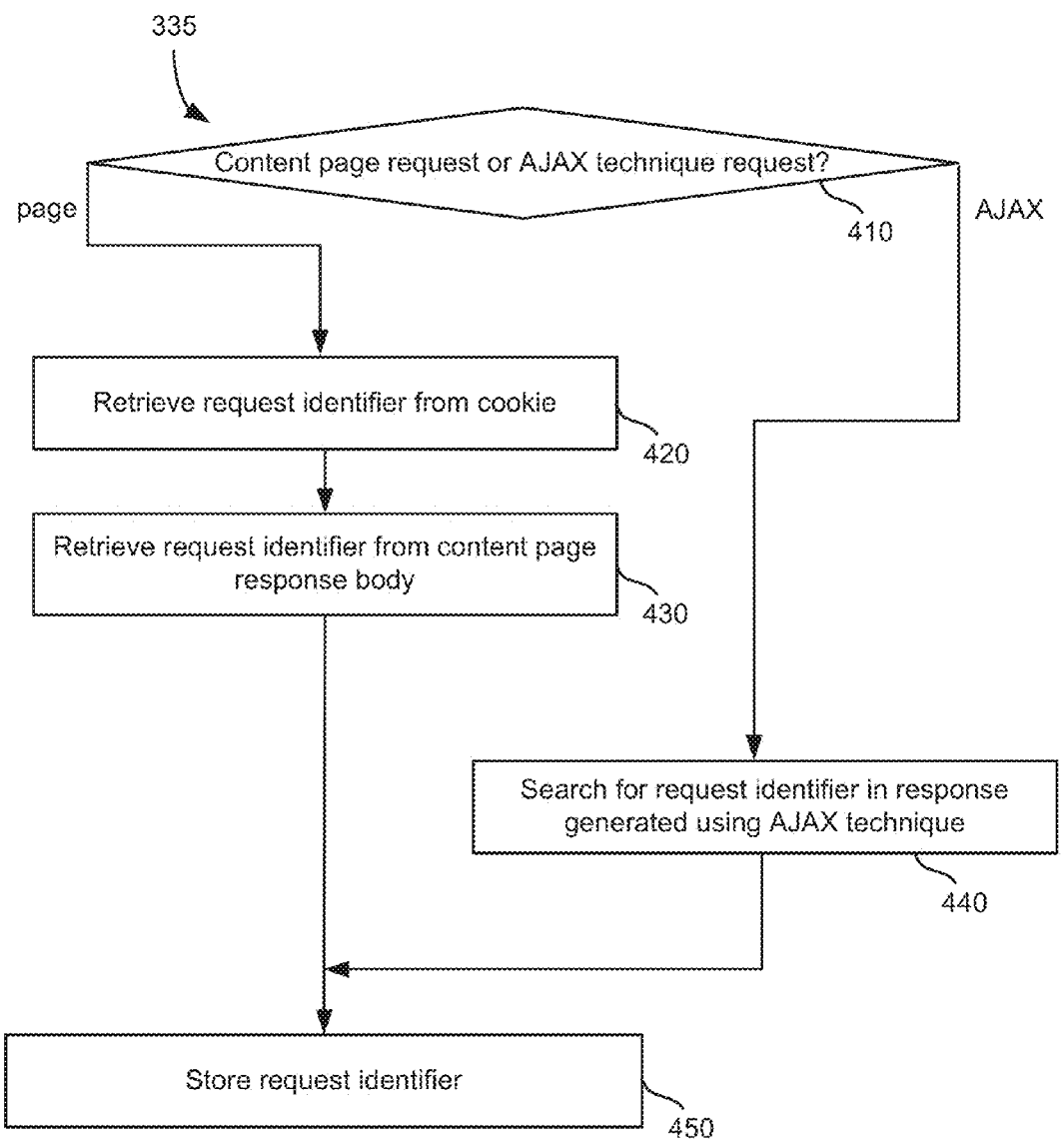
FIG. 4 is an exemplary method for storing request identifiers.

FIG. 4 is an exemplary method for storing request identifiers. The method of FIG. 4 may provide more information for step 335 of the method of FIG. 3. First, a determination is made as to whether the request sent at step 330 of the method of FIG. 3 is a client request or a request made based on AJAX techniques (e.g., JavaScript code that calls an XHR function which in turn makes a network call). If the request is one based on AJAX techniques, agent 112 may retrieve the request identifier from the response event at step 440. For example, the request identifier may be stored in (and retrieved from) an HTTP response header. In some embodiments, a request identifier for an XHR event (request generated using AJAX techniques) may be retrieved from a cookie or other file and/or data. The method of FIG. 4 then continues to step 450 where the request identifier is stored.

If the request was a client request, the request identifier may be provided in one or more of several ways, including a cookie or response body, for example in embedded Java script code. Agent 112 may retrieve the request identifier from a cookie at step 420.

In addition to client request ID, a cookie may also include (as written by a server processing the request) one or more tuples of one or more business transaction identifiers and time for each of one or more responses to be processed at the server. The tuple may be written to the cookie as well as a body, footer or other portion of the response.

Agent 430 may retrieve the request identifier from a content page response body at step 430. In some embodiments, the request identifier may be in one of a cookie or a response body, based on the whether the response is provided or whether the cookie has been sent, but may not be in both. As such, both a cookie and response body may be searched to retrieve the request identifier. The request identifier is then stored at step 450.

Figure 5:
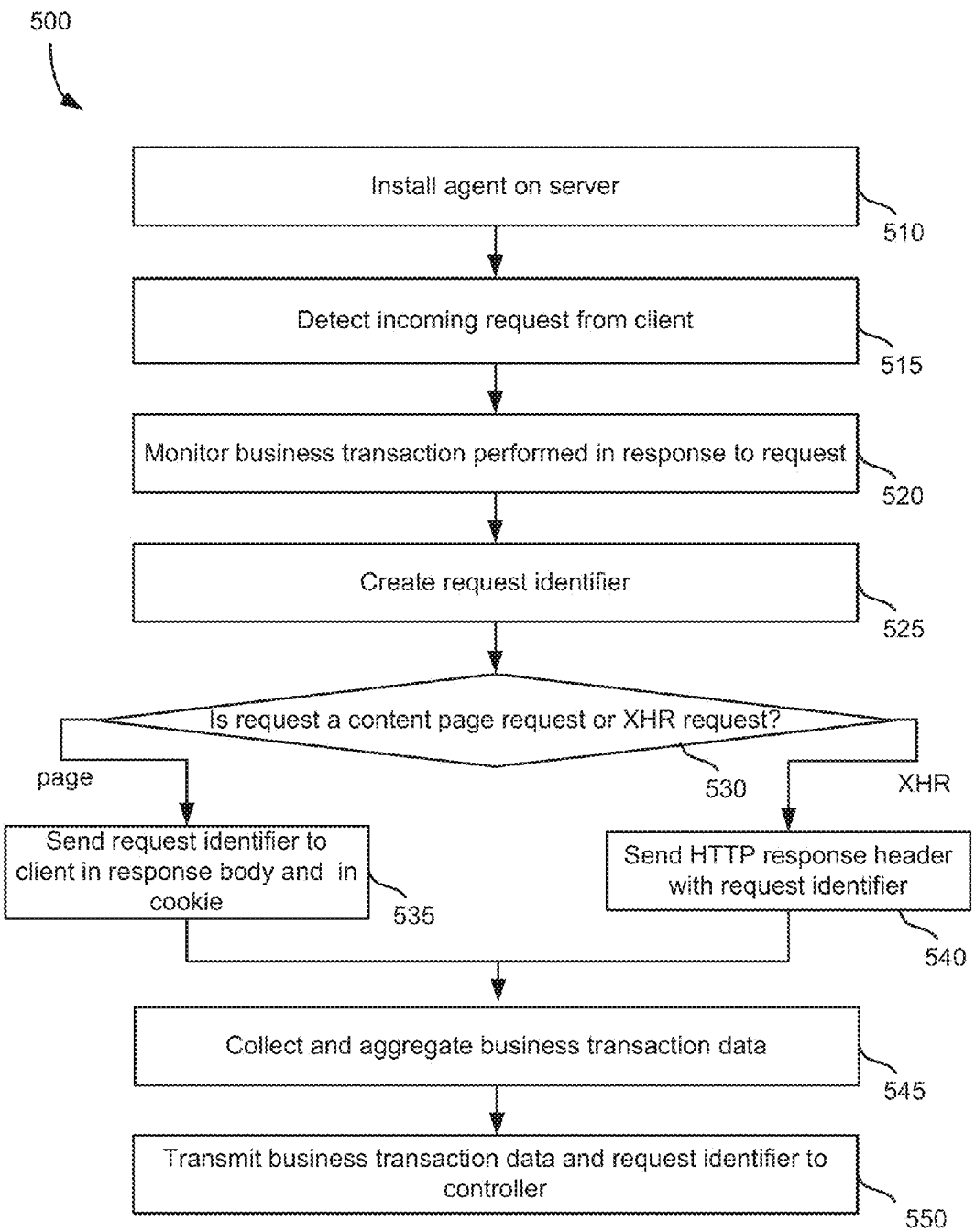
FIG. 5 is an exemplary method for monitoring a business transaction.

FIG. 5 is an exemplary method for monitoring a business transaction. The method of FIG. 5 may be performed by an agent on a server virtual machine, PHP program or code or other program executing on a server or hardware on the server. In embodiments, installing agents may include modifying exit and entry points for applications, which may be done by adding code "hooks" to the elements, instrumenting the bytecode of the programs, and other methods. For purposes of discussion, the method will be discussed with respect to agent 134 on server 130. The agent may be installed on server 130 at step 510. An incoming request from a client may be detected at step 515. The incoming request may originate from a content page element rendered within network browser 110. Business transactions performed in response to the request may be monitored at step 520.

A request identifier may be created for the detected request at step 525. The request identifier may be a global unique identifier that identifies the particular request. The request identifier may be transmitted to the requesting client in several ways, depending in part on the type of request that was received. If the request received was a client request (determined at step 530), the request identifier may be sent to the client in a response body and/or in a cookie at step 535. When sent in a cookie, the cookie may be sent at some point between receiving the initial request data and completing transmission of the response to the request. The cookie may be sent soon after receiving the request and at some point before the HTTP header is flushed. When sent in a request body, the request identifier may be included in the body footer, header, or other portions in the body or request. The method of FIG. 5 then continues to step 545. If the request is determined to an XHR request at step 530, the request identifier may be sent within an HTTP response header or other at step 540.

Business transaction data may be collected and aggregated by agent 134 at step 545. The business transaction data and the request identifier may be sent from the server agent to the controller at step 550. The request identifier may be associated with a particular "snap shot" of data, a collection data for a particular business transaction.

In embodiments, the relationship between a page element, such as a content page request or AJAX request, and a business transaction may be a many to many relationship. Hence, a page may include none, one or more Iframes and may be associated with zero or more business transactions, and a business transaction may be associated with multiple pages.

Figure 6:
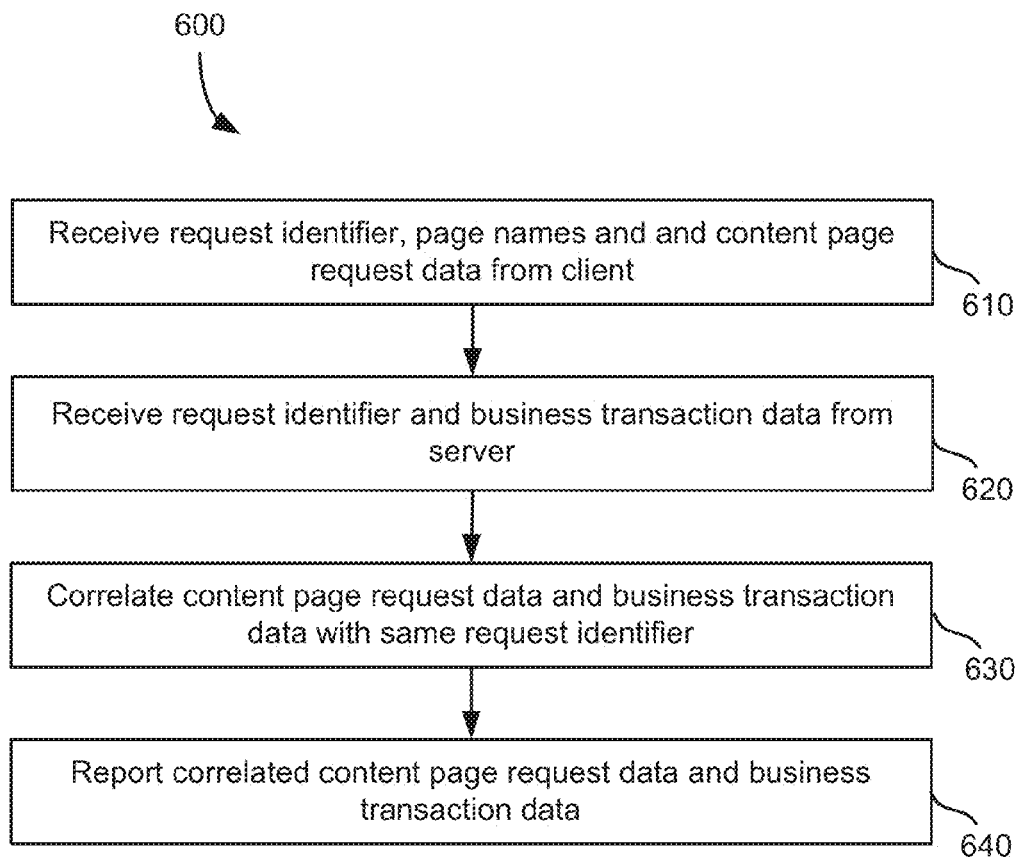
FIG. 6 is an exemplary method for correlating request and business transaction data by a controller.

FIG. 6 is an exemplary method for correlating request and business transaction data by a controller. The method of FIG. 6 may be implemented by data collector 160 and controller 190. Client request data, page names and a request identifier may be received at step 610 from client 105. The page names may include the name of the page element sending the request, the page elements parent node name, and the base page name for the requesting content page element. In embodiments, the data may be sent to data collector 160, which may then aggregate the data and transmit aggregated data to controller 190. The controller 190 may ultimately receive client request data, page names and request identifiers for many requests and from many one or more agents.

A request identifier and business transaction data may be received from one or more servers at step 620. The business transaction data may include data for creating a business transaction snapshot. The client request data and business transaction data may be correlated using request identifiers. Client request data associated with a particular request identifier may be correlated with business transaction data associated with a matching request identifier at step 630.

Client request data may be correlated with business transaction data to re-assemble a complete picture of a base page. The data may be correlated together using information about the iframes, requests using AJAX techniques, the content page and other elements make up the base page and send network requests. When client request data is ultimately transmitted from a client agent to the controller, the client request data may include an identifier for a particular request (content page, iframe, AJAX generated, or other request) as well as the parent page identifier and the content page base identifier. As client request data is received by the controller for each content page element or AJAX based request, a hierarchy of the requesting elements for a particular content page can be constructed using the request identifiers and parent page identifiers for the particular base content page. Once the hierarchy is constructed, the performance of each content page request can be related to other content page requests in the hierarchy, and the overall picture of performance for providing the base page can be constructed.

Additionally, the performance of each request of a content page may be correlated to one or more business transactions associated with each request associated the content page's hierarchy. For example, each iframe, AJAX generated request, and other page element may be correlated to a business transaction performed by a distributed server system, with the performance on each side of the network correlated together. The correlated information for the content page request and business transaction processing may be provided through a series of correlated reports, such as for example a transaction flow map (see FIG. 7) and a browser snapshot (see FIG. 8B).

In addition to correlating performance data, the present system may detect HTTP or Javascript errors and correlate them between a client content page request and a distributed transaction. The HTTP errors and Javascript errors may be detected at the client. The particular error may be detected for a particular request made from a content page element, such as for example a particular iframe, AJAX generated request, or other request. On the server side, any processing performed for the request may be correlated to the request for which the error was detected. As a result, rather than reporting that an entire content page is associated with an error, the particular request may be associated with the particular HTTP or Javascript error and the processing of the request associated with an error may be reported for the particular request. This allows an administrator to a much higher level of visibility and granularity with respect to what caused the error and the details of when the error occurred.

The correlated content page data and business transaction data may be reported at step 640. The data may be reported via email, SMS, or graphically through an interface. Examples of graphical reporting are provided in FIGS. 7-8B.

Figure 7:
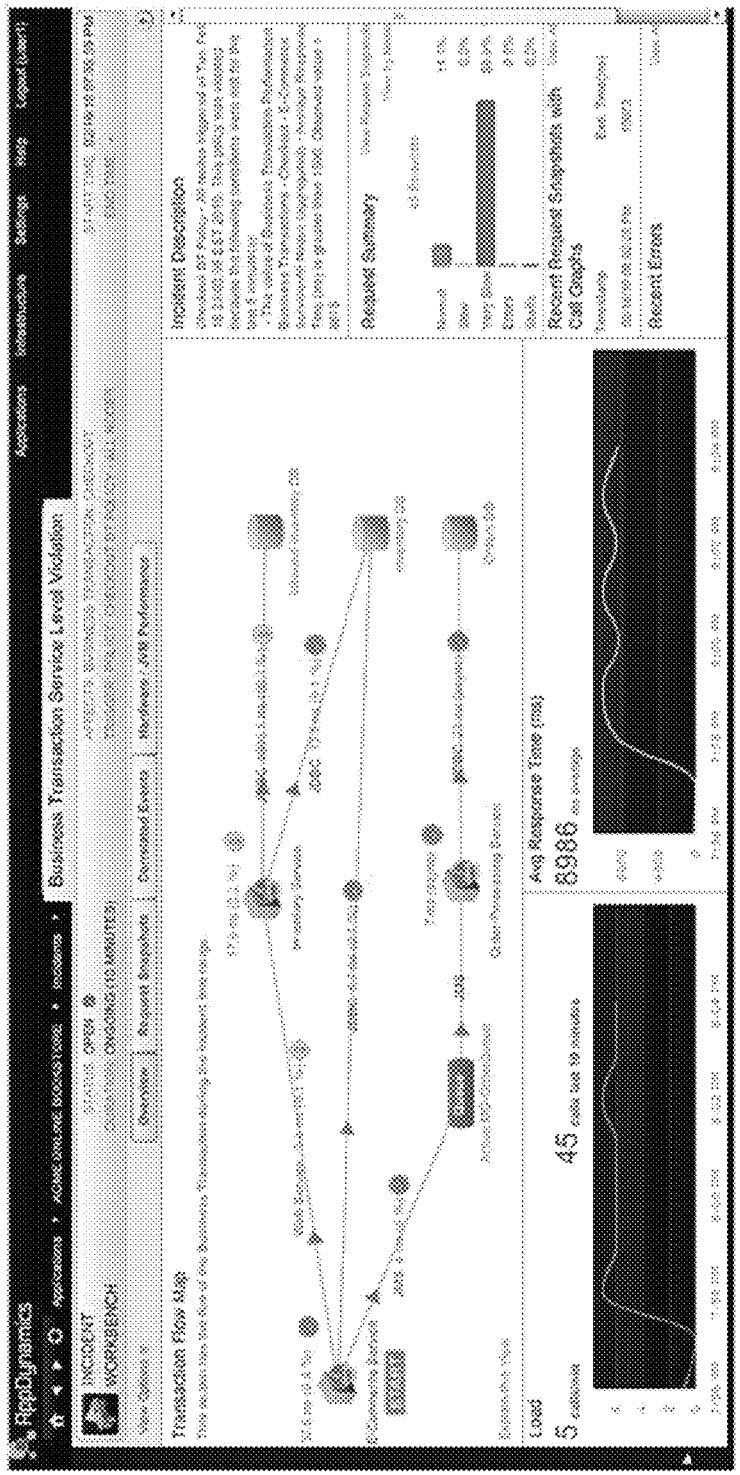
FIG. 7 is an interface for providing server-side application monitoring information that is correlated with a client request.

FIG. 7 is an interface for providing server-side application monitoring information that is correlated with a client request. In some embodiments, the interface of FIG. 7 can be provided by controller 190 as part of a web service provided over network server 125. The interface of FIG. 7 may provide information regarding the average time for processing parts of the business transaction initiated by the request sent from network browser 110. The business transaction of FIG. 7 and the request timing data of FIG. 7 are correlated together by controller 190 and may be provided by controller 190 to a user 194 through client device 192.

Figure 8A:
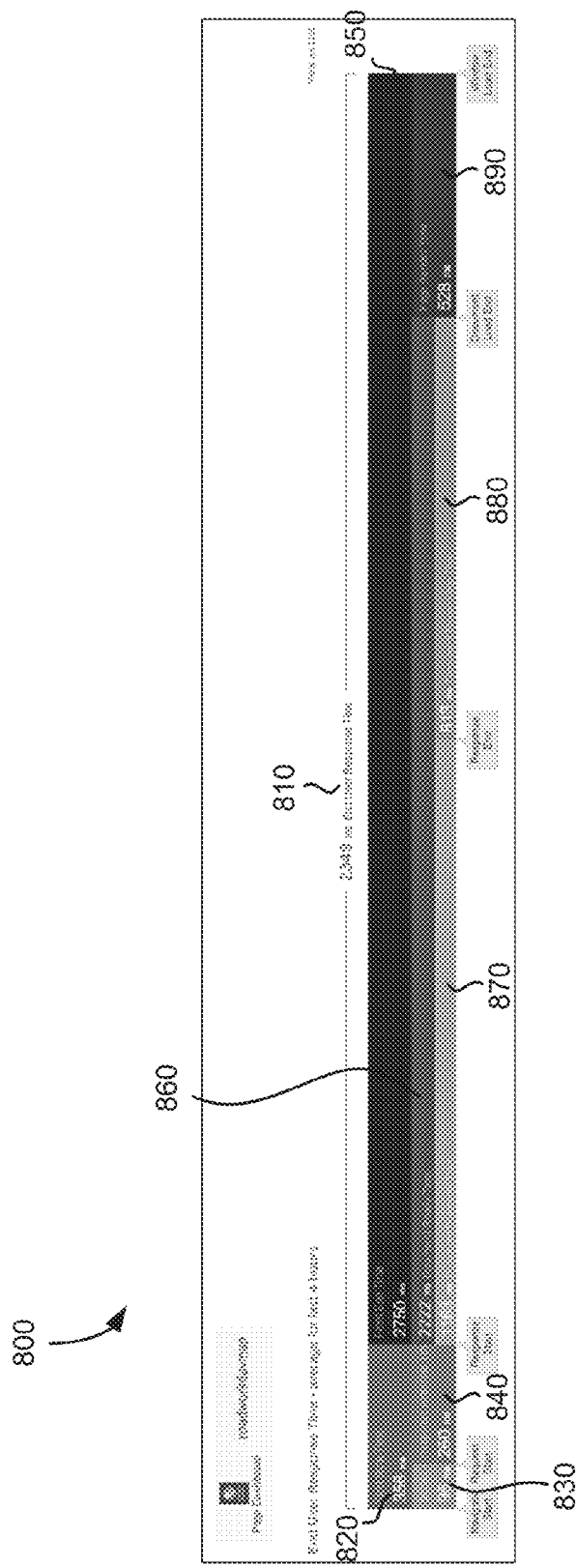
FIG. 8A is an interface for providing client-side request monitoring information that is correlated with a business transaction.

FIG. 8A is an interface for providing client-side request monitoring information that is correlated with a business transaction. The interface of FIG. 8A includes a sever connection time window 830 and response available time window 840. The server connection time window graphically represents the time taken by the browser to resolve and begin fetching a document from a server. The time may be spent executing redirects, domain look-up communication, TCP connect and SSL communications. The response available time may graphically represent the time taken by browser network 110 to receive a response from a server, and may be determined from the start of the request being received to the start of the response being received. The sum of the server connection time and the response available time may be considered the first byte time, as provided by first byte time window 820.

The interface of FIG. 8A also includes document download time window 870 and document processing time window 880. The document download time window may graphically represent the time taken by browser 110 to download the HTML document in the response. The document processing time window represents the time to load the HTML document. The sum of the document download time and document processing time is the document ready time, represented by window 860. Page render time window 890 represents the time to download the remaining resources and render the page in a network browser. The sum of the document ready time and page render time may be represented as the front end time as shown in window 850.

Figure 8B:
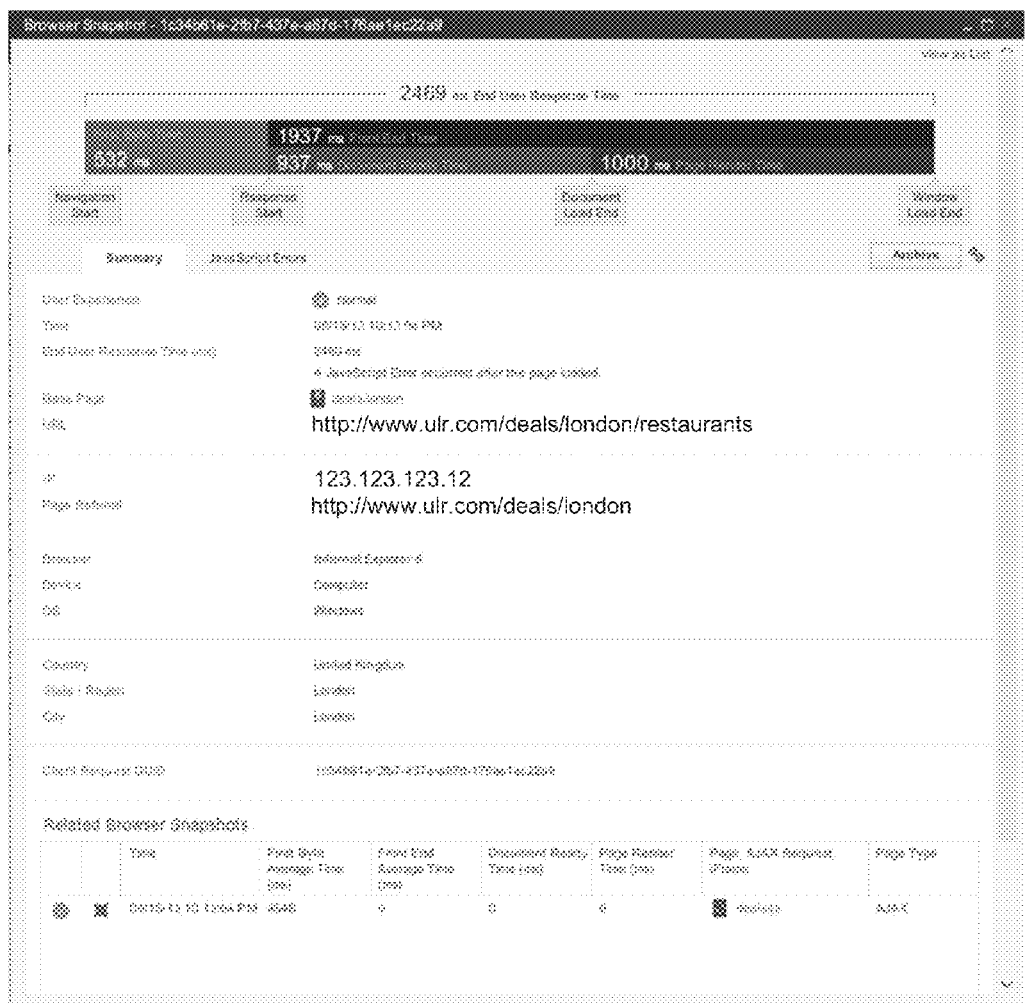
FIG. 8B is an interface for providing page composition data associated with a user request.

FIG. 8B is an interface for providing page composition data associated with a user request. The interface 895 of FIG. 8B includes a summary tab and a server tab. The server tab is not selected in the interface, though an exemplary server side interface is displayed in FIG. 7.

The summary tab is selected in FIG. 8B and provides performance data, for example information regarding performance, network, device, and geographical location for the monitored client request. The performance data provided includes user experience, time, end user response time, elements of the page such as an AJAX request, a URL, a parent page and a parent page URL. The network information includes IP and page referral data. The device information includes the browser used, device and operating system. The geographical information includes the country, state or region, and city. Also displayed in the summary tab are a client request data associated with the request and information for related browser snapshots. The related browser snapshots include time, first byte average time, front end average time, document ready time, page render time, a name for the page, AJAX request or iFrame, and page type.

Figure 9:
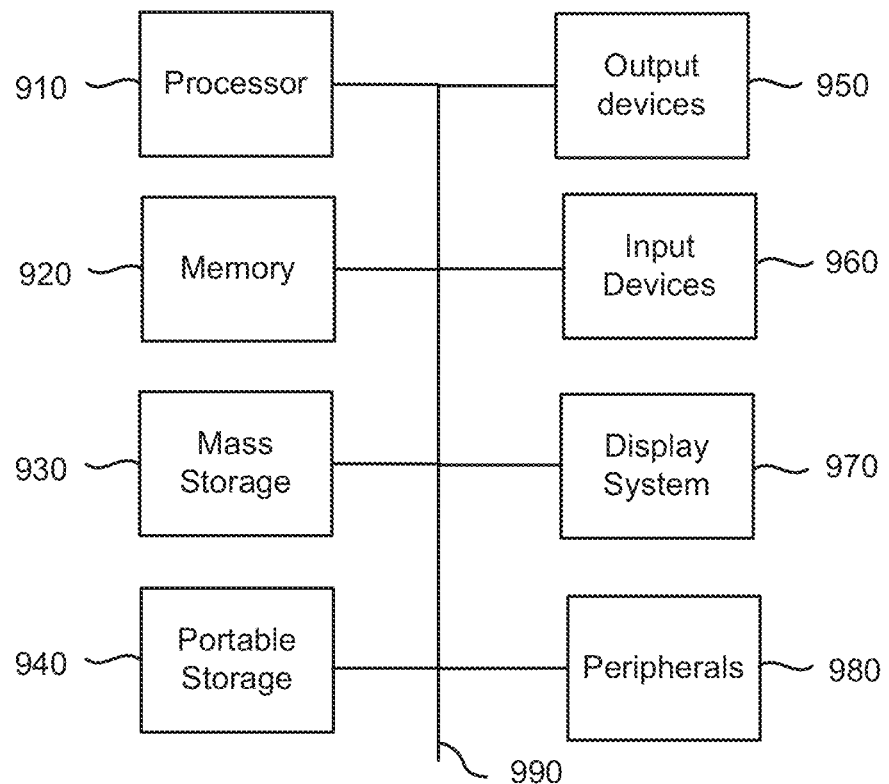
FIG. 9 is a block diagram of an exemplary computing system for implementing the present technology.

FIG. 9 is a block diagram of an exemplary computing system for implementing the present technology. System 900 of FIG. 9 may be implemented in the contexts of the likes of client computer 105, servers 130, 140, and 150, controller 190 and client device 192, data collection 195, and data stores 180 and 185. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 10:
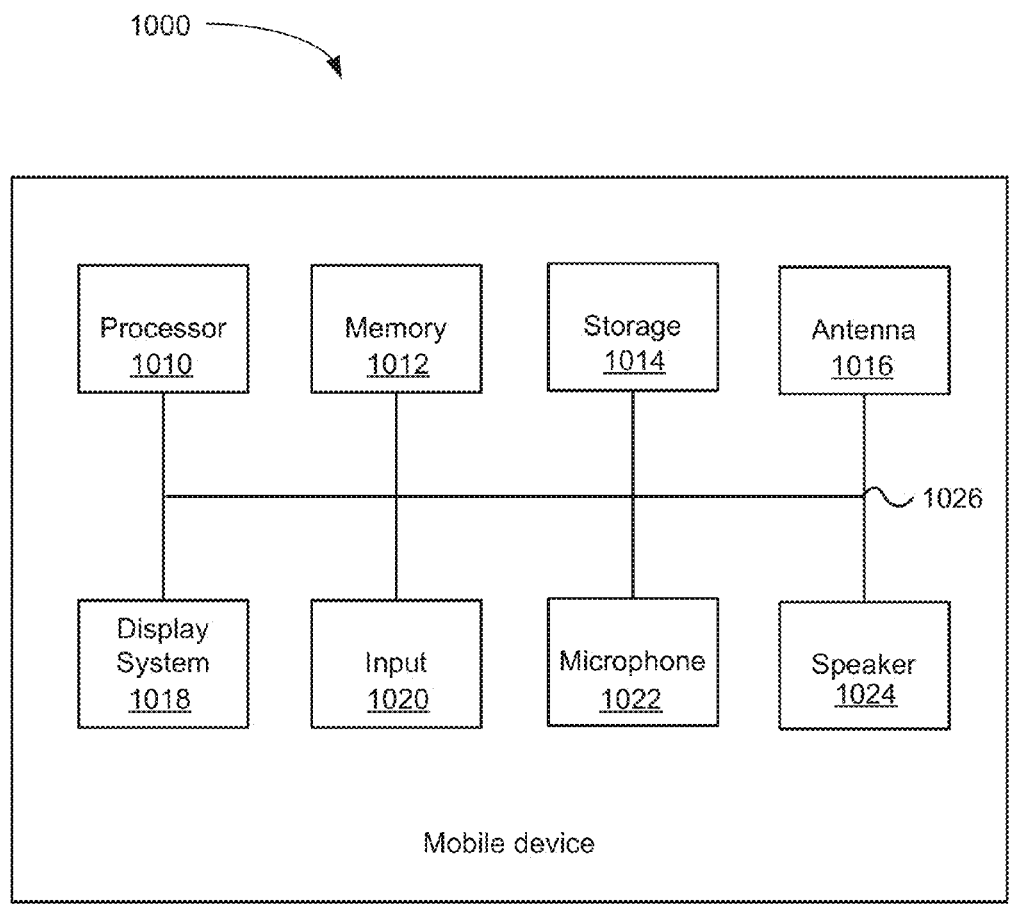
FIG. 10 is a block diagram of an exemplary mobile device for implementing the present technology.

FIG. 10 is a block diagram of an exemplary mobile device for implementing the present technology. The system of FIG. 10 may be used to implement mobile device 115. Mobile device 1000 of FIG. 10 includes one or more processors 1010 and memory 1012. Memory 1012 stores, in part, programs, instructions and data for execution and processing by processor 1010. The system 1000 of FIG. 10 further includes storage 1014, one or more antennas 1016, a display system 1018, inputs 1020, one or more microphones 1022, and one or more speakers 1024.

The components shown in FIG. 10 are depicted as being connected via a single bus 1026. However, the components 1010-1024 may be connected through one or more data transport means. For example, processor unit 1010 and main memory 1012 may be connected via a local microprocessor bus, and storage 1014, display system 1018, input 1020, and microphone 1022 and speaker 1024 may be connected via one or more input/output (I/O) buses.

Memory 1012 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 1012 can store the system software for implementing embodiments of the present invention for purposes of loading that software into main memory 1010.

Antenna 1016 may include one or more antennas for communicating wirelessly with another device. Antenna 1016 may be used, for example, to communicate wirelessly via Wi-Fi, Bluetooth, with a cellular network, or with other wireless protocols and systems. The one or more antennas may be controlled by a processor 1010, which may include a controller, to transmit and receive wireless signals. For example, processor 1010 execute programs stored in memory 1012 to control antenna 1016 transmit a wireless signal to a cellular network and receive a wireless signal from a cellular network.

Display system 1018 may include a liquid crystal display (LCD), a touch screen display, or other suitable display device. Display system 1018 may be controlled to display textual and graphical information and output to text and graphics through a display device. When implemented with a touch screen display, the display system may receive input and transmit the input to processor 1010 and memory 1012.

Input devices 1020 provide a portion of a user interface. Input devices 1020 may include an alpha-numeric keypad, such as a keyboard, for inputting alpha-numeric and other information, a touch-screen, microphone, camera, buttons or switches, a trackball, stylus, or cursor direction keys.

Microphone 1022 may include one or more microphone devices which transmit captured acoustic signals to processor 1010 and memory 1012. The acoustic signals may be processed to transmit over a network via antenna 1016.

Speaker 1024 may provide an audio output for mobile device 1000. For example, a signal received at antenna 1016 may be processed by a program stored in memory 1012 and executed by processor 1010. The output of the executed program may be provided to speaker 1024 which provides audio. Additionally, processor 1010 may generate an audio signal, for example an audible alert, and output the audible alert through speaker 1024.

The mobile device system 1000 as shown in FIG. 10 may include devices and components in addition to those illustrated in FIG. 10. For example, mobile device system 1000 may include an additional network interface such as a universal serial bus (USB) port.

The components contained in the computer system 1000 of FIG. 10 are those typically found in mobile device systems that may be suitable for use with embodiments of the present invention and are intended to represent a broad category of such mobile device components that are well known in the art. Thus, the computer system 1000 of FIG. 10 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a client request, comprising
   detecting, by an agent installed at a client device, content page requests sent by content page elements in a content page rendered by a network browser application at the client device to one or more remote servers;
   detecting, by the agent installed at the client device, a unique request identifier for each content page request;
   capturing, by the agent, performance data associated with processing the content page requests by the network browser application;
   capturing, by the agent, business transaction data associated with processing business transactions at the one or more remote servers, the business transactions performed in response to the client requests and associated with the client requests based on the unique client request identifiers;
   reporting a name of each content page element in the content page that sent the content page requests to the one or more remote servers, a parent node name for each content page element, a base page name for each content page element, the performance data associated with processing the content page requests and the unique request identifier associated with each content page request, the unique request identifier used to correlate one or more of the business transactions with each content page request sent by a corresponding content page element;
   detecting an error associated with one or more of the content page requests;
   identifying specific content page element or elements that sent the one or more of the content page requests associated with the detected error; and
   identifying performance of the business transaction correlated with the identified client request associated with the error.

2. The method of claim 1, wherein the unique request identifier is associated with a request sent from an Iframe element within the content page.

3. The method of claim 1, wherein the unique request identifier is associated with a request due to use of AJAX techniques within the content page.

4. The method of claim 1, wherein the reporting includes transmitting an identifier for a parent page for an element of the content page that sent the request.

5. The method of claim 1, wherein the unique request identifier is received from the one or more remote servers in a cookie.

6. The method of claim 5, wherein the cookie is received before receipt of the response is complete.

7. The method of claim 1, wherein the unique request identifier is received in a portion of a response to each request.

8. The method of claim 1, wherein the unique request identifier is received in a header of an HTTP response from the one or more remote servers.

9. The method of claim 1, wherein reporting includes sending performance metrics and the unique request identifier for each content page request.

10. The method of claim 1, wherein each content page request is associated with two or more of the business transactions.

11. The method of claim 1, wherein reporting the performance data includes:
providing performance data for the one or more of the business transactions associated with each content page request; and
providing performance data for the network browser application processing each content page request.

12. The method of claim 1, including:
detecting, by the agent, additional content page requests sent to one or more additional remote servers in response to a user input; and
detecting additional unique request identifiers associated with the detected additional requests, wherein performance metrics are reported for the content page requests and the additional content page requests corresponding to the user input.

13. A non-transitory computer readable storage medium having embodied thereon a program, the program being executable by a processor to perform a method for processing a client request, the method comprising:
detecting, by an agent installed at a client device, content page requests sent by content page elements in a content page rendered by a network browser application at the client device to one or more remote servers;
detecting, by the agent installed at the client device, a unique request identifier for each content page request;
capturing, by the agent, performance data associated with processing the content page requests by the network browser application;
capturing, by the agent, business transaction data associated with processing business transactions at the one or more remote servers, the business transactions performed in response to the client requests and associated with the client requests based on the unique client request identifiers;
reporting a name of each content page element in the content page that sent the content page requests to the one or more remote servers, a parent node name for each content page element, a base page name for each content page element, the performance data associated with processing the content page requests and the unique request identifier associated with each content page request, the unique request identifier used to correlate one or more of the business transactions with each content page request sent by a corresponding content page element;
detecting an error associated with one or more of the content page requests;
identifying specific content page element or elements that sent the one or more of the content page requests associated with the detected error; and
identifying performance of the business transaction correlated with the identified client request associated with the error.

14. The non-transitory computer readable storage medium claim 13, wherein the request identifier is associated with a request sent from an Iframe element within the content page.

15. The non-transitory computer readable storage medium claim 13, wherein the request identifier is associated with a request sent from an element generated using AJAX techniques within the content page.

16. The non-transitory computer readable storage medium claim 13, wherein the reporting includes transmitting an identifier for a parent node for an element of the content page that sent the request.

17. The non-transitory computer readable storage medium claim 16, wherein the unique request identifier is received from the one or more remote servers in a cookie.

18. The non-transitory computer readable storage medium claim 16, wherein the cookie is received before receipt of the response is complete.

19. The non-transitory computer readable storage medium claim 13, wherein the unique request identifier is received in a portion of a response to each request.

20. The non-transitory computer readable storage medium claim 13, wherein the unique request identifier is received in a header of an XHR response.

21. The non-transitory computer readable storage medium claim 13, wherein reporting includes sending performance metrics and the unique request identifier for each content page request.

22. The non-transitory computer readable storage medium claim 13, wherein each content page request is associated with two or more of the business transactions.

23. The non-transitory computer readable storage medium claim 13, wherein reporting the performance data includes:
providing performance data for the one or more of the business transactions associated with each content page request; and
providing performance data for the network browser application processing each content page request.

24. The non-transitory computer readable storage medium claim 13, further comprising receiving input associated with a content page through the network browser on a client device.

25. The non-transitory computer readable storage medium claim 13, further comprising:
detecting, by the agent, additional content page requests sent to one or more additional remote servers in response to a user input; and
detecting additional unique request identifiers associated with the detected additional requests, wherein performance metrics are reported for the content page requests and the additional content page requests corresponding to the user input.

26. A system for processing a client request, comprising:
a processor;
memory; and
one or more software modules stored in the memory and executed by the processor to perform operations including:
detect, by an agent installed at a client device, content page requests sent by content page elements in a content page rendered by a network browser application at the client device to one or more remote servers;

detect, by the agent installed at the client device, a unique request identifier for each content page request;

capture, by the agent, performance data associated with processing the content page requests by the network browser application;

capture, by the agent, business transaction data associated with processing business transactions at the one or more remote servers, the business transactions performed in response to the client requests and associated with the client requests based on the unique client request identifiers;

report a name of each content page element in the content page that sent the content page requests to the one or more remote servers, a parent node name for each content page element, a base page name for each content page element, the performance data associated with processing the content page requests and the unique request identifier associated with each content page request, the unique request identifier used to correlate one or more of the business transactions with each content page request sent by a corresponding content page element;

detect an error associated with one or more of the content page requests;

identify specific content page element or elements that sent the one or more of the content page requests associated with the detected error; and identify performance of the business transaction correlated with the identified client request associated with the error.

27. The system of claim 26, wherein the request identifier is associated with a request sent from an Iframe element within the content page.

28. The system of claim 26, wherein the unique request identifier is associated with a request due to use of AJAX techniques within the content page.

29. The system of claim 26, wherein the reporting includes transmitting an identifier for a parent page for an element of the content page that sent the request.

30. The system of claim 26, wherein the unique request identifier is received from the one or more remote servers in a cookie.

31. The system of claim 30, wherein the cookie is received before receipt of the response is complete.

32. The system of claim 26, wherein the unique request identifier is received in a portion of a response to each request.

33. The system of claim 26, wherein the unique request identifier is received in a header of an XHR response.

34. The system of claim 26, wherein reporting includes sending performance metrics and the unique request identifier for each content page request.

35. The system of claim 26, wherein each content page request is associated with two or more of the business transactions.

36. The system of claim 26, the modules executable to report the performance data including:
providing performance data for the one or more of the business transactions associated with each content page request; and
providing performance data for the network browser application processing each content page request.

37. The system of claim 26, including:
detecting, by the agent, additional content page requests sent to one or more additional remote servers in response to a user input; and
detecting additional unique request identifiers associated with the detected additional requests, wherein performance metrics are reported for the content page requests and the additional content page requests corresponding to the user input.

* * * * *